United States Patent

[11] 3,633,473

[72] Inventor Wada Yashuhiro
 Tokyo, Japan
[21] Appl. No. 87,110
[22] Filed Nov. 5, 1970
[45] Patented Jan. 11, 1972
[73] Assignee Kabushiki Kaisha Koparu
 Tokyo-to, Japan
[32] Priority Nov. 10, 1969
[33] Japan
[31] 44/89887

[54] EXPOSURE CONTROL APPARATUS FOR PHOTOGRAPHIC CAMERA
 5 Claims, 2 Drawing Figs.
[52] U.S. Cl. .................................................. 95/10 CT
[51] Int. Cl. .................................................. G03b 7/08
[50] Field of Search............................................ 95/10 CE, 10 CT

[56] References Cited
 UNITED STATES PATENTS
3,353,462 11/1967 Suzuki........................ 95/10

Primary Examiner—Samuel S. Matthews
Assistant Examiner—Michael L. Gellner
Attorney—Cushman, Darby & Cushman ABSTRACT: This exposure control apparatus for photographic camera comprises a photoconductive element adapted to receive the light through the objective lens system, a photoconductive element adapted to directly receive the light coming from the object to be photographed, a capacitor for storing a voltage having a magnitude corresponding to the ratio of resistance values between said two photoconductive elements, a sawtooth voltage generating circuit, a field effect transistor adapted to be controlled of its switching action by the comparison of the voltage stored by said capacitor and the sawtooth voltage produced by said sawtooth voltage generating circuit, and a capacitor—which constitutes a CR delay circuit—adapted to be intermittently charging by the switching action of said field effect transistor. By use of this exposure control apparatus, the control of exposure time can be always performed so as to be precisely in compliance with the changes in the photographic light.

PATENTED JAN 11 1972  3,633,473

INVENTOR
Yasuhiro Wada

BY
Cushman, Darby + Cushman
ATTORNEYS

EXPOSURE CONTROL APPARATUS FOR PHOTOGRAPHIC CAMERA

BACKGROUND OF THE INVENTION

1. Field of the Invention

The present invention is concerned with an exposure control apparatus, and more particularly, it relates to an exposure control apparatus for photographic camera arranged so that the amount of light which has passed through the objective lens system is metered to determine the exposure time.

2. Description of the Prior Art

There have been known various types of photographic cameras equipped with an electronic shutter adapted to control the exposure time by utilizing a CR delay circuit containing a photoconductive element, such as CdS, as a resistor element. In a photographic camera, in general, which is equipped with an electronic shutter, it would be ideal if arrangement is provided so that the light which has passed through the objective lens is received by a light-receiving element, such as CdS, so that the delay time of the aforesaid delay circuit may be determined thereby. To attain this end, it will be necessary that the light-receiving element be arranged either in the immediate foreground of the shutter or in the optical system of the finder of, for example, a single-lens reflex camera. When it is intended to position or incorporate the light-receiving element in such a manner as mentioned above, it will be necessary to arrange—in the former instance—so that the light-receiving element is caused to retreat from the path of the photographic light at least during the opening and closing movement of the shutter, whereas in the latter instance, the photographic light directed to the light-receiving element should be shut off from this element at least during the opening and closing movement of the shutter. For this reason, it will become necessary to store the condition of the light-receiving element prior to performing an actual exposure. In actual photography, it frequently occurs that the condition of the light passing through the objective lens undergoes changes even after the condition of the light-receiving element has been stored, on account of the changes occurring in the natural light or of the use of a flash device. Accordingly, in a camera of said type, it will be necessary to arrange so that the exposure time which is controlled by the stored condition of the light-receiving element can be adjusted also to comply with the subsequent change which occurs in the photographic light after the storage of the condition of the light-receiving element. At present, there have been developed various cameras designed in the manner as above so as to function that the condition of the light-receiving element is stored prior to performing an actual exposure. However, the mechanism of these cameras of the prior art are not designed so that the actual exposure time is controlled by taking the subsequent change occurring in the photographic light into account. As such, these cameras of the prior art have the drawback that the photograph taken proves, when developed, to be an overexposure or an underexposure contrary to the expectation of the photographer.

SUMMARY OF THE INVENTION

It is, therefore, an object of the present invention to provide an exposure control apparatus for photographic camera, which is arranged so that the condition of the light after it has passed through the objective lens is stored as an electric amount determined by the comparison with the condition of the ambient light and that the exposure time is precisely controlled in accordance with this stored electric amount.

Another object of the present invention is to provide an exposure control apparatus for photographic camera, which is arranged that when the condition of light passing through the objective lens changes after the condition of light which has initially passed through this lens is stored as an electric amount, the exposure time which should be controlled in accordance with said stored electric amount can be adjusted to comply with such a change.

DESCRIPTION OF THE PREFERRED EMBODIMENT

Figure 1:
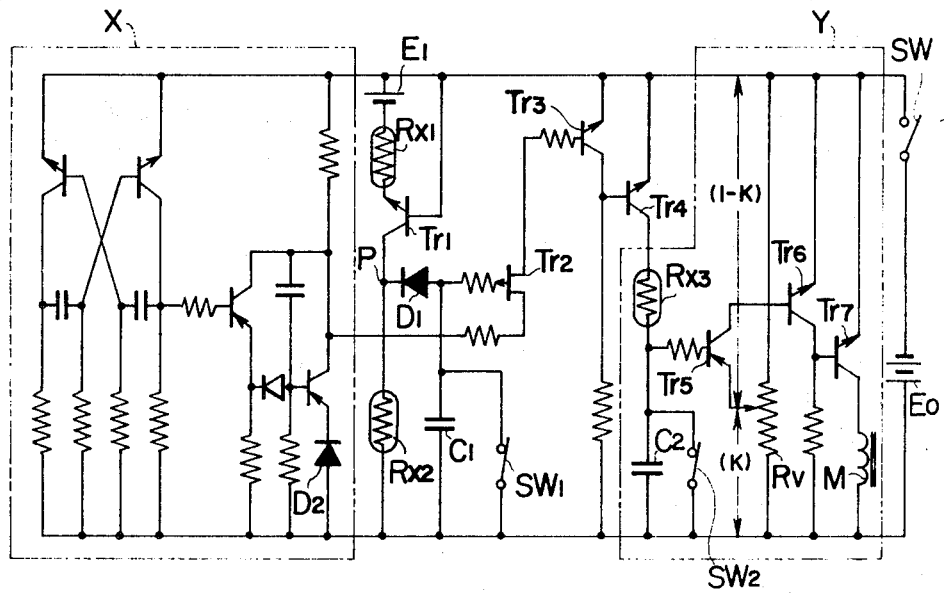
FIG. 1 is an electric circuitry showing an embodiment of the exposure control apparatus of the present invention.

In FIG. 1, there is shown a preferred example of the exposure control circuitry according to the present invention. In FIG. 1, the symbol $Rx_1$ represents a photoconductive element, such as CdS, which is adapted to receive the light which has passed through a objective lens of the camera. During the photometric operation, this photoconductive element $Rx_1$ is exposed to the light coming through the objective lens from the object to be photographed, but during the opening and closing movement of the shutter, this light is shut off from the photoconductive element. The photoconductive element $Rx_1$ and an auxiliary power source $E_1$ are connected in series between the base and emitter electrodes of a transistor $Tr_1$ having its base electrode grounded. The symbol $Rx_2$ represents a photoconductive element, such as CdS, which is connected to the collector electrode of the transistor $Tr_1$ and adapted to always directly receive the light coming from the object to be photographed. The symbol $C_1$ represents a capacitor which is connected—in parallel with the photoconductive element $Rx_2$—to the collector electrode of the transistor $Tr_1$ via a diode $D_1$. This capacitor $C_1$ is capable of storing the voltage applied across the two terminals of the photoconductive element $Rx_2$, and this voltage is determined in accordance with the ratio of the resistance values between the photoconductive elements $Rx_1$ and $Rx_2$ whenever the transistor $Tr_1$ is rendered conductive. The symbol $SW_1$ represents a switch for discharging the charge of the capacitor $C_1$. This switch $SW_1$ is opened by, for example, a "shutter cocking operation," and is closed with the completion of an exposure. Said diode $D_1$ serves to prevent the charge of the capacitor $C_1$ from being discharged continuously throughout the period in which the switch $SW_1$ is kept open. The block defined by two dots and a dash line and indicated by the letter X represents a known sawtooth voltage generating circuit, so that the detailed explanation of this circuit arrangement is omitted. The symbol $Tr_2$ represents a field effect transistor which will hereinafter to be referred simply as a FET, the gate electrode of which is connected to the juncture of the capacitor $C_1$ and the diode $D_1$, whereas the source electrode is connected to the output terminal of the aforesaid sawtooth voltage generating circuit X. Accordingly, this FET $Tr_2$ is held in the nonconductive state so long as its source potential is lower than its gate potential. For the length of period from the time the source potential has been leveled with the gate potential till the time the source potential returns to zero by virtue of the decay of the sawtooth voltage, the FET $Tr_2$ is held in the conductive state. As shown in the drawing, a diode $D_2$ which is intended to compensate for the drop of the voltage applied to the source electrode of the FET $Tr_2$ is inserted in the emitter circuit of the output transistor of the sawtooth voltage generating circuit X. To the drain electrode of the FET $Tr_2$ is connected the base electrode of a transistor $Tr_3$. Furthermore, to the collector electrode of the transistor $Tr_3$ is connected a transistor $Tr_4$. Thus, this transistor $Tr_4$ is rendered "on" whenever the FET $Tr_2$ is in the nonconductive state, whereas it is rendered "off" whenever the FET $Tr_2$ is rendered conductive. The block defined by two dots and a dash line and indicated by the letter Y represents a known exposure time control circuit for electronic shutter. The exposure time or the delay time is determined by the combination of a photoconductive element $Rx_3$, such as CdS, which is connected to the collector electrode of the transistor $Tr_4$ and arranged so as to be able to always directly receive the light coming from the object to be photographed, and a capacitor $C_2$ which is connected in series to said photoconductive element $Rx_3$. The symbol $SW_2$ represents a switch which is connected in parallel with the capacitor $C_2$ and is adapted to be opened simultaneously with the opening of the shutter blades (not shown) and to be closed with the closure of these shutter blades. To the juncture of the photoconductive element $Rx_3$ and the capacitor $C_2$ is connected the base electrode of a transistor $Tr_5$, the emitter electrode of which is connected to the slidable terminal of a potentiometer Rv assigned for introducing exposure factor such as the diaphragm aperture. The collector electrode of the transistor $Tr_5$ is connected to the base electrode of a transistor $Tr_6$, whereas the collector electrode of this transistor $Tr_6$ is connected to the base electrode of a transistor $Tr_7$. To the collector electrode of the transistor $Tr_7$ is connected an electromagnet M which is intended for controlling the closing action of the shutter blades. The symbol SW represents a power switch which is connected in series with a power source battery Eo. This power switch SW is adapted to be closed simultaneously with the depression of the shutter button and to be opened at the time the exposure of the shutter comes to an end. It should be noted that the photoconductive elements $Rx_1$, $Rx_2$ and $Rx_3$ which are employed in this invention are selected so that the variation characteristics of their resistance values to the changes in light are identical for each of these elements. Furthermore, the two photoconductive elements $Rx_1$ and $Rx_2$ are selected so that the resistance values which are exhibited by these two elements when they are exposed to the same light are such that the latter shows a resistance value which is equal to or greater than that of the former. Moreover, the cycle T of the sawtooth voltage which is produced by the sawtooth voltage generating circuit X is set to be in the order of one one-hundredth to two one-hundredth of the minimum opening and closing time obtained from the shutter employed, or more specifically, in case the minimum opening and closing time is one one-thousandth of a second, the cycle T is set to the order of one one-hundred thousandths to two one-hundred thousandths of a second. Also, the peak voltage of the sawtooth wave is set so as to be equal to the voltage of the auxiliary power source $E_1$.

Description will next be directed to the action of the exposure control apparatus of the present invention by referring to the electric circuitry shown in FIG. 1. In the respective equations which are used in the following explanation, the values assumed by the respective electric elements are indicated by the symbols assigned to them, respectively.

When it is intended to take a photograph, the shutter (not shown) is first cocked and then the objective lens is directed toward the object to be photographed and the shutter button (not shown) is depressed. Whereupon, the switch SW is closed, rendering both the sawtooth voltage generating circuit X and the exposure time control circuit Y to the active state. Concurrently therewith, the transistor $Tr_1$ is rendered conductive. In this state, the potential Vp of the juncture P attains the following level:

$$Vp = \frac{Rx_2}{Rx_1} E_1$$

in accordance with the resistance value ratio of the photoconductive element $Rx_2$ and the photoconductive element $Rx_1$. This potential Vp is stored as the voltage across the terminals of the capacitor $C_1$ by opening the switch $SW_1$ in association with the depression of the shutter button. More specifically, the state of the photographic light which irradiates the photoconductive element $Rx_1$ after having passed through the objective lens is stored, in the form of Vp shown by the aforesaid equation, by the capacitor $C_1$. The potential Vp thus stored is maintained at a constant value by the action of the diode $D_1$ even if the photographic light irradiating the photoconductive element $Rx_1$ is shutoff, or in other words, even when the photoconductive element $Rx_1$ is caused to retreat from the path of the photographic light. As a result, the gate electrode of the FET $Tr_2$ is biased by this potential Vp.

The shutter is relieved of its cocked state at the final stage of the releasing operation which is effected by the shutter button and the shutter blades are opened (it should be understood that, in the instance of a focal plane shutter, the front curtain starts). During this part of operation, the electromagnet M is in the state of having been already energized because the transistor $Tr_7$ is rendered "on" simultaneously with the depression of the shutter button. Therefore, by the attracting force acquired by this energized electromagnet M, the shutter blades (or the rear curtain in a focal plane shutter) are held, via a known means, in their state of having opened the exposure aperture, so that the exposure to the light-sensitive material is started. On the other hand, the switch $SW_2$ is opened in association with the opening movement of the shutter blades. Along with this, there is started charging of the capacitor $C_2$ via the photoconductive element $Rx_3$, so that the counting of the exposure time by the exposure time control circuit is started. According to the present invention, the charging of the capacitor $C_2$ is performed intermittently at a predetermined constant cycle by the action of the FET $Tr_2$ which alternately repeats its "on" state and "off" state by virtue of the mutual relationship between the aforesaid stored potential Vp and the sawtooth voltage produced by the sawtooth voltage generating circuit X.

Figure 2:
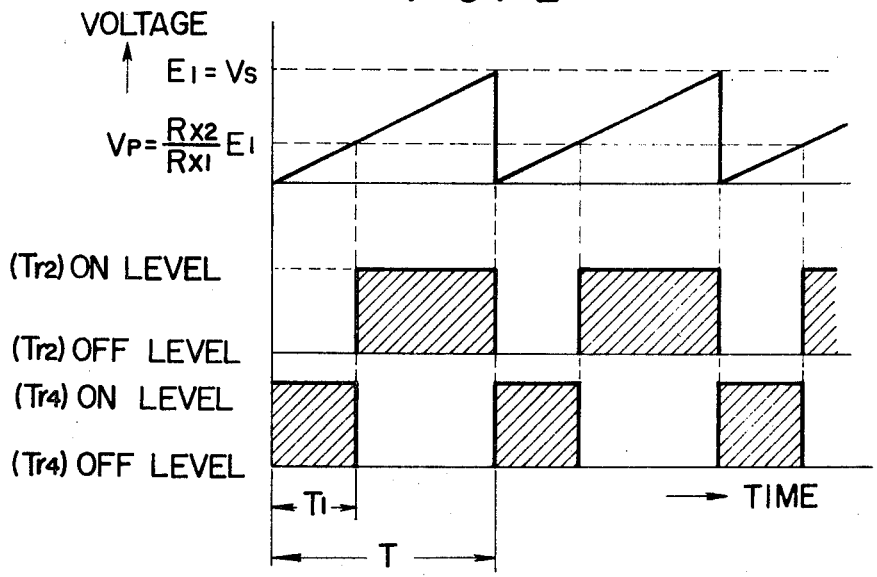
FIG. 2 is an illustration for explaining the action of the circuitry shown in FIG. 1.

This action will be described by referring to FIG. 2. Since the FET $Tr_2$ is kept in its nonconductive state so long as its source potential is lower than the gate potential, the transistor $Tr_3$ is rendered "off," while the transistor $Tr_4$ is rendered "on," so that the capacitor $C_2$ is charged. On the other hand, the FET $Tr_2$ is held in its "on" state for the period from the time the sawtooth voltage supplied to the source electrode of said transistor $Tr_2$ by the sawtooth voltage generating circuit X is elevated up to the level at which the source potential is equal to the gate potential till the time the source potential to zero on account of the decay of the sawtooth voltage. Accordingly, the transistor $Tr_3$ is rendered "on," while the transistor $Tr_4$ is rendered "off," so that the charging of the capacitor $C_2$ is suspended. In this way, the capacitor $C_2$ is charged intermittently at a cycle which is equal to the cycle T of the sawtooth voltage. It should be noted that the FET $Tr_2$ is of such camera, high input impedance and that it hardly has any effect on the voltage with which the capacitor $C_1$ is charged. Let us now assume that the length of time in which the FET $Tr_2$ is held in its "off" state, or in other words, the charging time of the capacitor $C_2$, is represented by $T_1$, then the charging rate $T_1/T$ of the capacitor $C_2$ may be expressed by the ratio of the resistance values between the photoconductive elements $Rx_2$ and $Rx_1$, namely, by $Rx_2/Rx_1$, as is clear from FIG. 2. When the capacitor $C_2$ is charged up to a predetermined level in the manner as described above, the state of the transistors $Tr_5$ and $Tr_6$ is switched over from nonconductive to conductive, respectively, so that the transistor $Tr_7$ is switched over from the "on" state to the "off" state. As a result, the electromagnet M is deenergized and loses its magnetic force. Along with this, the shutter blades (or the rear curtain in a focal plane shutter) which have till then been held open are released to close the exposure aperture. In association with this movement, the power switch SW is opened, and the switches $SW_1$ and $SW_2$ are closed. As a consequence, the sawtooth voltage generating circuit X is rendered inoperative, and the charges of the capacitors $C_1$ and $C_2$ are discharged. With this, a single exposure control action completes.

In general, the delay time or the exposure time which is determined by the exposure time control circuit Y as shown in FIG. 1 is expressed by:

$$Rx_3 \cdot C_2 \cdot \log \frac{1}{1-K}$$

so that the exposure time Ts which is controlled actually by the exposure control apparatus of the present invention will become:

$$Ts = \frac{T}{T_1} \cdot Rx_3 \cdot C_2 \cdot \log \frac{1}{1-K}$$
$$= \frac{Rx_1}{Rx_2} \cdot Rx_3 \cdot C_2 \cdot \log \frac{1}{1-K} \quad (1)$$

As described previously, according to the present invention, the photoconductive elements $Rx_1$, $Rx_2$ and $Rx_3$ employed invariably has such a characteristic that the ratio of the changes in their resistance values to the changes occurring in the amount of light are equal to each other. Therefore, the resistance values of the respective elements may be expressed by:

$$Rx_1 = \alpha \cdot Rx_2 \quad (2)$$
$$Rx_2 = \beta \cdot Rx_3 \quad (3)$$

(wherein: $\alpha$ and $\beta$ represent proportional constants)
As a consequence, from the equations (2) and (3), the equation (1) will become:

$$\begin{aligned} Ts &= \alpha \cdot Rx_3 \cdot C_2 \cdot \log \frac{1}{1-K} \\ &= \alpha \cdot \frac{Rx_1}{\alpha \cdot \beta} \cdot C_2 \cdot \log \frac{1}{1-K} \\ &= \frac{1}{\beta} \cdot Rx_1 \cdot C_2 \cdot \log \frac{1}{1-K} \quad (4) \end{aligned}$$

Thus, it will be understood that the exposure time Ts is determined by both the resistance value of the photoconductive element $Rx_1$ and the capacitance value of the capacitor $C_2$.

As will be clear from the foregoing description, it will be understood that, according to the present invention, even in the event that the condition of the photographic light has undergone a change after the potential Vp of the juncture P has been stored by the capacitor $C_1$, or in other words, either after the photographic light which is incident to the photoconductive element $Rx_1$ is shut off or the photoconductive element $Rx_1$ has been caused to retreat from the path of the photographic light, the exposure time which is actually controlled is adjusted precisely in accordance with the changes of said subsequent change in the photographic light. Therefore, by the particular use of a photoconductive element $Rx_3$ which quickly responds to the changes in the amount of incident light, it is possible to perform the so-called automatic flash photography. Also, according to the present invention, the action of the FET $Tr_2$ causes virtually no fluctuation in the voltage across the terminals of the capacitor $C_1$. It, therefore, becomes possible to shorten the charging time of the capacitor $C_1$ by the use of such one as having a small value of capacitance. Even in case the object to be photographed is dark, and accordingly, even where the photoconductive elements $Rx_1$ and $Rx_2$ show large resistance values, the storage of the potential of the juncture P by the capacitor $C_1$ is effected properly. Furthermore, according to the present invention, the respective photoconductive elements are adapted to receive, at the same time, the light coming from the object to be photographed. Therefore, it is possible to have the exposure time controlled always accurately to the brightness of a wide range of the object to be photographed.

I claim:
1. An exposure control apparatus for a photographic camera having an exposure time control circuit comprising: a first photoconductive element adapted to directly receive the light coming from the object to be photographed, a first capacitor connected in series with said first photoconductive element, a first switching transistor adapted to have its switching action controlled by the charge voltage of said first capacitor, and an electromagnet connected to the output side of said first transistor for holding the shutter in the open state, wherein said exposure control apparatus further includes a second photoconductive element adapted to receive the light passing through the objective lens system, a third photoconductive element adapted to directly receive the light coming from the object to be photographed, a second capacitor for storing a voltage having a magnitude corresponding to the ratio of resistance value between said second and third photoconductive elements, a sawtooth voltage generating circuit, a second switching transistor adapted to have its switching action controlled by the comparison of the voltage stored by said second capacitor and the sawtooth voltage produced by said sawtooth voltage generating circuit, and a transistor adapted to be rendered conductive whenever said second switching transistor is rendered nonconductive to thereby charge said first capacitor via said first photoconductive element.

2. An exposure control apparatus according to claim 1, in which said second switching transistor is a field effect transistor having its gate electrode connected to a terminal of said second capacitor and having its source electrode connected to the output terminal of said sawtooth voltage generating circuit.

3. An exposure control apparatus according to claim 1, in which said first, second and third photoconductive elements are selected so that the rates of change in the resistance values of these three photoconductive elements to the changes in light are equal to each other and that the resistance value of said third photoconductive element is greater than the resistance value of at least said second photoconductive element.

4. An exposure control apparatus according to claim 1, in which said sawtooth voltage generating circuit is selected so that the cycle of the sawtooth voltage produced by said circuit lies within the range of from one one-hundredth to two one-hundredths of the minimum opening and closing time of the shutter.

5. An exposure control apparatus according to claim 1, in which to said second capacitor is connected a diode for preventing the discharging of the charge of said second capacitor during the period of exposure time controlling operation.

* * * * *